Dec. 1, 1959  K. E. SAMPSEL  2,914,935
LAUNDRY APPARATUS
Filed Aug. 16, 1957  2 Sheets-Sheet 2

INVENTOR
KENNETH E. SAMPSEL
BY M. C. Freudenberg
ATTORNEY

United States Patent Office 2,914,935
Patented Dec. 1, 1959

2,914,935

LAUNDRY APPARATUS

Kenneth E. Sampsel, Mansfield, Ohio, assignor to Westinghouse Electric Corporation, East Pittsburgh, Pa., a corporation of Pennsylvania Application August 16, 1957, Serial No. 678,581

1 Claim. (Cl. 68—12)

This invention relates to a machine for cleaning textiles or the like and incorporating a system for heating a cleaning fluid such as water in the machine.

The cleaning machine in which this invention is embodied may be of the type shown, for example, in E. J. Osterhus et al. Patent No. 2,807,963, relating to tumbler type washing machines and granted October 1, 1957 to the assignee of the present invention.

Among the objects of this invention is to provide an improved fluid heating system in a machine of the above type with safety control features for controlling the temperature to which the fluid is heated and for preventing damage to the heating apparatus in the event the machine is not properly supplied with cleaning fluid.

A more specific object of the invention is to control the energization of a fluid heater of the above type in response to the presence of fluid or the amount of fluid in the cleaning machine, as indicated by a fluid level actuated switch or the like.

Another object of the invention is to control the heating of fluid in the heating tank of a cleaning machine in response to the presence of fluid or the flow of fluid in the tank.

A further object of this invention is to provide thermostatic control of the fluid heater in a cleaning machine of the above type, the thermostatic control being capable of providing hot fluid for initial cleaning or washing and fluid at a lower temperature for subsequent rinsing.

Among the features of this invention as applied to a domestic washer of the type mentioned, for example, in the above patent application, are the provision of a stationary, heat resistant, plastic water heating tank spaced from a resiliently mounted tub in which the textiles are washed, flexible conduit means and a motor driven pump for recirculating wash liquid through the tub and heating tank, an electric immersion heater in the tank and means for controlling the energization of said heater including thermostatic switches responsive to the temperature of the liquid, a flow control switch for preventing energization of the heaters until liquid is flowing through the tank and a water level control switch for preventing energization of the heaters until a predetermined amount of water has entered the tub.

The control means for the heater also operates, while the water is being heated during a wash step of the washing program, to interrupt the timer controlling the washing program, thus assuring a minimum period of agitation of the textiles during the washing step after the wash water is heated to the desired temperature.

Also, in accordance with a second embodiment of the invention, the main motor driven means that agitates or tumbles the textiles is deenergized during the heating portion of the wash step where the rate of heating is so low that the time required to heat the water is too long to permit continuous agitation during heating without detrimentally affecting the life of the textiles.

The foregoing and other objects are effected by the invention as will be apparent from the following description and claim taken in connection with the accompanying drawings, forming a part of this application, in which:

Figure 1:
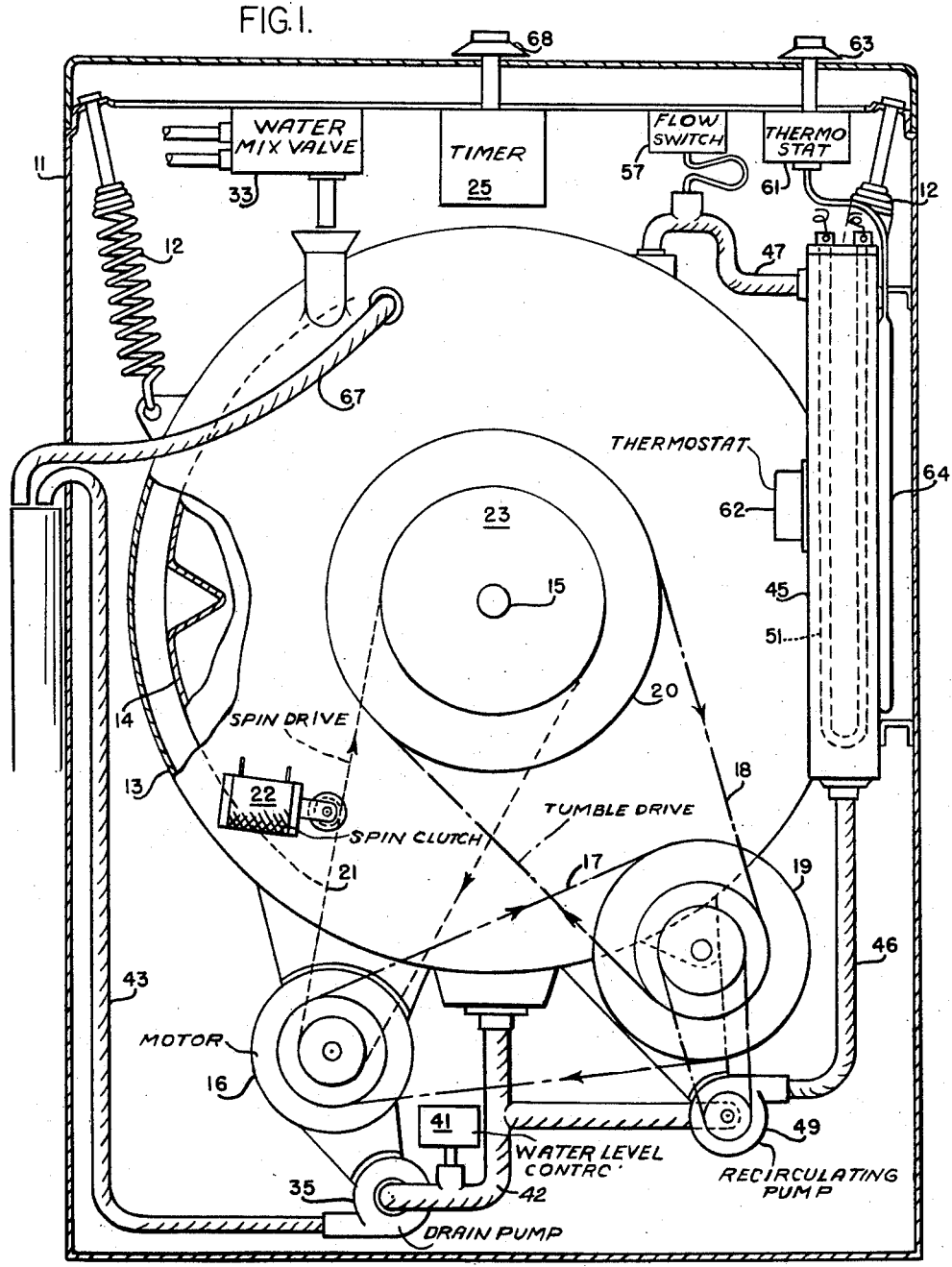
Fig. 1 is a rear view of a domestic textile washing machine with the rear of the casing cut away, and showing water heating and other mechanical components of the machine.

Referring to Fig. 1, the washing apparatus includes a casing 11 forming a frame within which a plurality of springs 12 resiliently support a generally cylindrical tub 13. The tub is provided with an access opening (not shown) on the side thereof opposite that shown in Fig. 1, for gaining access to a rotatable washing basket 14 having a generally horizontal, axially extending supporting shaft 15 journalled in the back wall of the tub. The basket may be rotated at low speed to wash textiles by tumbling them in wash water within the basket, and, subsequently, at higher speed for centrifuging washing liquid from the textiles.

The basket is rotated at relatively low speed for tumbling the load by driving means comprising an electric motor 16 suitably supported by the tub 13 and carrying a first pulley connected, by means of belts 17 and 18 and an idler pulley 19 of a speed reducing means, to a sheave 20. The latter is connected to the basket shaft 15 by means of a conventional oneway over-running clutch (not shown). The motor is also arranged to directly drive the basket at relatively high speed for centrifuging by means of a belt 21 controlled by a solenoid operated belt-tightening spin clutch 22. When the spin clutch 22 is actuated to tighten the belt 21, the latter drives a pulley 23 which is fixed to the basket shaft 15, and the shaft 15 overruns the tumbling drive pulley 20 because of the one-way clutch connection therebetween.

Figure 2:
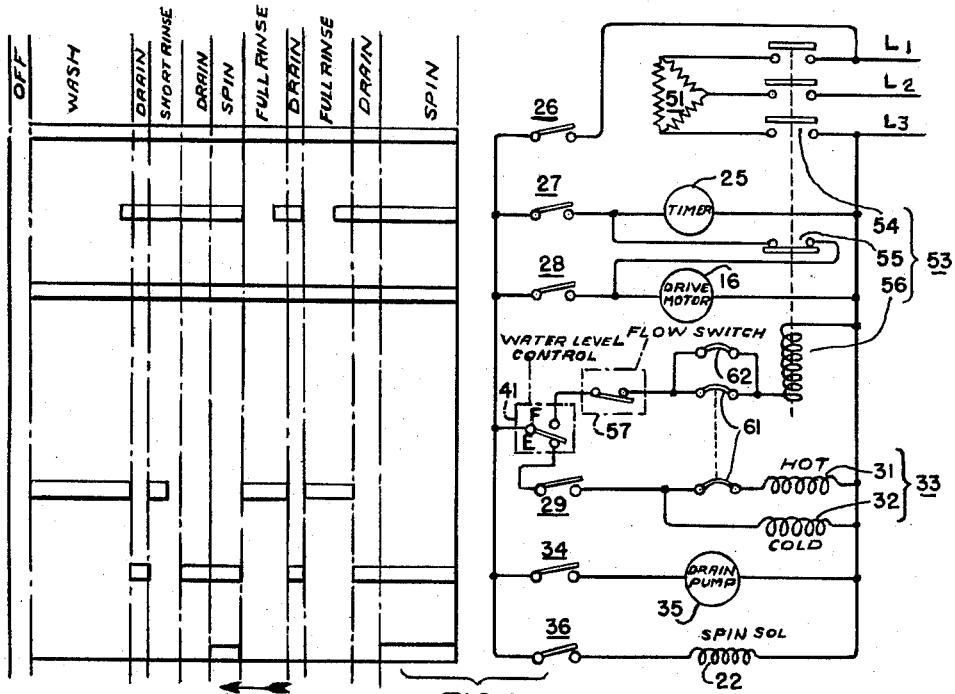
Fig. 2 is a control circuit diagram for the machine shown in Fig. 1 with a chart illustrating the sequential operation of the switches of a motor driven timer.

The washer shown in Fig. 1 is designed for full automatic operation and includes a motor driven program timer 25 having a plurality of switches for sequentially controlling various steps of a washing program, as described hereinafter. As seen in Fig. 2, the timer 25 includes a main line switch 26, switch 27 for the motor of timer 25, switch 28 for the drive motor 16, switch 29 for both hot and cold water solenoids 31 and 32 of a conventional water admitting valve 33, switch 34 for an electric motor driven drain pump 35, and switch 36 for the spin clutch 22.

Washing liquid may be admitted to the tub 13 at different temperatures by energizing either or both of the solenoids 31 and 32 of the valve 33. These solenoids are connected in series with both the timer switch 29 and normally closed contacts of a conventional water level control switch 41. This latter switch includes a suitable pressure actuated device (not shown) that responds to water pressure in a drain hose 42 beneath the tub to actuate a single-pole, double-throw switch. With substantially no liquid in the tub, this double-throw switch 41 assumes the position shown in Fig. 2 with the contacts at E (empty) closed to energize the windings of the valve 33 when the timer 25 is in an appropriate position. When the liquid reaches a predetermined high level in the tub 13, the switch is actuated by snap action to its other position with the contacts at F (filled) closed for conditioning a heater relay circuit for energization in a manner to be described later. The switch 41 may be of the type shown in Patent 2,720,564, issued October 11, 1955.

The drain hose 42 extends from a sump at the bottom of the tube 13 to the motor-driven drain pump 35 controlled by timer switch 34. The discharge end of an outlet hose 43 from the pump 35 is disposed above the normal water level in the tub so that a drain valve is not required. When there is water in the tub the drain hose 42 and pump 35 are flooded and the liquid level in the outlet hose 43 assumes the level of the liquid in the tub. During washing and rinsing periods the pump 35 is inactive, but is operated at the end of these periods to discharge water from the machine.

In accordance with this invention, an elongated water heating tank 45 is supported in a generally vertical position by the casing 11 at the rear of the tub 13. The heater tank is approximately 18 inches deep and has a generally rectangular cross-section of approximately 2½ x 2¾ inches. The material of the tank is plastic, preferably a heat resistant molded flockfilled phenolic resin. The fill for the phenolic may be cotton or asbestos fibers. The tank 45 is rigidly secured to the casing and connected to the tub structure by means of flexible hoses or conduits 46 and 47 which permit the tub 13 to move relative to the heating tank 45 and casing 11 during washing and spinning operations. The inlet hose 46 is connected to an opening in the bottom of the tank 45 and is supplied with liquid from the tub 13 by means of a motor-driven, liquid recirculating pump 49 having its inlet communicating with the drain hose 42. As shown in Fig. 1, the recirculating pump is rigidly supported from the tub 13 and is belt driven from a sheave added to the idler pulley 19 of the tumble drive means for the basket.

The heater tank 45 is open at the top to accommodate an electric sheathed immersion heater 51 that extends down into the tank and forms a closure for the upper end of the latter. The outlet hose 47 from the tank extends from the upper end thereof to an opening at the top of the tub. Connected to this outlet hose is a flow switch 57 which is actuated to a closed position when the rate of flow of washing liquid from the tank to the tub is above a predetermined value and is open at other times. The flow switch acts as a safety control for the heater 51 as will be described below, and, since the flow switch per se forms no part of this invention, further description thereof is deemed unnecessary.

The heater 51 may comprise three separate elements, as indicated in Fig. 2, connected in delta to conductors L1, L2 and L3 of a three-phase power source, by means of a relay 53 having a three-pole normally open switch 54 which may be moved to its closed position by energizing a relay winding 56. Each heater may be energized at 2500 watts to provide a total heating rate of approximately 7500 watts in the tank 45. The relay 53 also includes a fourth switch 55 which is normally closed and controls the timer motor 25 in a manner to be discussed.

Energization of the relay winding 56 is controlled by a pair of thermostatic switches 61 and 62 responsive to the temperature of liquid in the machine. One pole of the double pole thermostat 61 and thermostat 62 are connected in parallel and in series with a flow switch 57, the upper contacts F of the water level control switch 41, and timer switch 26. The other pole of thermostat 61 is connected in series with the hot water solenoid 31. The thermostats 61 and 62, being supported by the relatively rigid casing 11 and tank 45, are not subject to the vibratory movement of the tub 13 during operation of the machine. The water level control switch 41 prevents energization of the heater relay 53 until there is a predetermined water level in tub 13, as mentioned previously. The flow switch 57 is responsive to water flow in the hose 47 leading from the upper end of the water heating tank 45 and prevents the relay 53 from energizing heaters 51 until the flow of water through the tank 45 in response to operation of the pump 49 is sufficient to prevent abnormal heating of the tank.

The thermostat 61 is actuated by a conventional hydraulic system (not shown) that includes a temperature sensing, fluid filled bulb 64 extending along the outer wall of the tank 45. This thermostat 61 may be adjusted by a knob 63 to automatically snap open at any temperature from 104° F. (40° C.) up to a temperature which is a few degrees below the boiling temperature of water, 212° F. (100° C.), but must be manually reset to its closed position by manipulation of the knob.

The thermostat 61, as set forth above, comprises two switches that are simultaneously operated, one of which is connected in series with the relay coil 56 and the other of which is connected in series with the hot water solenoid 31 of the valve 33. This latter switch enables the valve 33 to supply hot water during the first filling of the machine and remains open after the first heating operation to maintain the hot water solenoid deenergized throughout the remainder of the washing program.

The thermostat 62 is calibrated to open at approximately 104° F. (40° C.) and may comprise a bimetallic disc type actuator secured in good heat transfer relationship with the wall of the tank. This thermostat 62 is of the cycling type and automatically closes when its temperature drops slightly below its opening temperature.

Since the wash water in the tub 13 may be heated to a temperature approaching boiling, a greater amount of suds is usually formed than in a washer using lower water temperatures. Unless somehow relieved, the suds may build up a pressure in the tub to effect premature actuation of the water level control, resulting in an inadequate water fill. This relief and provision for overflow of suds is provided by a vent hose 67 connected to the back wall of the tub near the upper side thereof. This vent hose has an internal diameter of the order of 1⅛ inches and leads to a point adjacent the outlet end of the drain hose 43, where both may communicate with any suitable drain.

In the circuit diagram of Fig. 2, the timer switches 26, 27, 28, 29, 34 and 36 are disposed opposite a chart of the washing program. The blocked areas of this chart indicate the periods during which the respective switches are closed. These blocked areas represent, for example, cam surfaces operated by the timer motor for closing the timer switches, the washing operation starting at the left of the chart and progressing step by step to the right across the chart when the timer motor is energized. In an "off" position of the timer, none of the timer switches are closed. In all active positions of the timer during the washing program, the line switch 26 is closed, along with switch 28 controlling the main drive motor 16. The other timer switches will be closed during the program in the manner discussed below in connection with the operation of the washer.

The timer 25 may be manually adjusted to any point in the washing program by manually rotating in one direction a control knob 68 having indicia corresponding to the steps in the washing program listed at the top of the program charts in the drawings. During operation of the machine the timer knob 68 will automatically advance in the same direction to indicate the progress of the washing program, but the knob may be advanced manually at will to shorten or eliminate any step in the program.

Operation

To effect operation of the washer shown in Fig. 1, the manually adjustable timer is moved by means of the manual control knob 68, from "off" to a point within the wash range on the timer dial depending upon the length of the washing step which is desired. In the "wash" position, the timer switch 29 is closed to complete, through the water level control switch 41, in the position E as shown, a circuit for energizing the fill valve solenoids 31 and 32. At this same time, the drive motor 16 is energized through the timer switches 26 and 28 and remains energized throughout the entire program controlled by the timer. The motor 16 drives the basket at tumbling speed except when the switch 36 is closed to energize the spin clutch 22.

After setting the timer dial, the manually adjustable thermostat 61 is reset to its closed position and adjusted to select the temperature to which the wash water will be heated. As water enters the tub 13, it will gravitate to the drain hose 42 and will flow to the recirculating pump 49, which is operated simultaneously with the drive motor 16. The recirculating pump 49 will force liquid up through the heating tank and when sufficient liquid has entered the tub to actuate the water level control 41 to its upper position closing the contacts at F and to provide a continuous flow through the heating tank 45 so as to close the flow switch 57, a circuit will be completed through the water level control switch 41, the flow switch 57 and the thermostatic switches 61 and 62 to energize the heater relay coil 56.

As the tub is being filled, the timer motor 25 is energized through the drive motor switch 28 and the normally closed relay switch 55. When the heater relay coil 56 is energized to close the heater switches 54, the normally closed relay switch 55 opens to cause the timer motor to pause during the wash period until the water in the heating tank attains a temperature sufficiently high to open both thermostats 61 and 62. When this water temperature is attained, the heater relay coil 56 is deenergized and the timer is again energized through the relay switch 55. After a short interval, the timer advances to close the timer switch 27, which will maintain the timer motor continuously energized for a period in which the tub is drained. The latter operation is effected by closure of timer switch 34 to activate the drain pump 35.

The draining of the tub is followed by a short "timed fill" with cold water for approximately one minute for a first short rinse effected by energization of the cold water solenoid 32 through timer switch 29 and the lower or "empty" contact E of the water level control 41. Note that the thermostat 61 in series with the hot water solenoid 31 has been opened and, since it is of the manually closed type, remains open for the remainder of the washing program. To terminate the timed fill for the first rinse, switch 29 in the cold water solenoid 32 circuit is opened and, following a short tumbling period, the drain pump 35 is again activated through timer switch 34 during the next "drain" and "spin" steps as timer switch 36 effects high speed rotation of the basket 14 to centrifuge washing liquid from the textiles by energizing solenoid 22 in the spin step.

At the end of the first "spin" step, the timer switch 27 opens, but this is of no moment as the timer remains energized through timer switch 28 and the closed switch 55 of the heater relay 53. At this time, the switch 29 is closed to admit water to the machine for the first full rinsing of the textiles. During this fill, the water level control 41 and flow switch 57 will again function as described, to control energization of the heater relay coil, but at this time, only the automatically reset thermostat 62 is closed. Since the fill water will, no doubt, be below 104° F. (40° C.), the thermostat 62 will be closed and the relay coil 56 energized to close the heater switches 54 after a sufficient amount of water enters the tub. During heating of the water in the tub, operation of the timer motor will again be interrupted, by means of the relay switch 55 until the thermostat 62 opens to deenergize the relay coil 56. After the tub 13 fills and the water is heated for a full rinse, the timer switch 27 closes while the drain pump 35 is again energized through switch 34 to discharge the rinse water from the tub. Following the drain period, the switch 27 again opens while another filling operation for full rinsing under control of the water level control switch 41, the flow switch 57 and the automatic reset thermostat 62 takes place, the timer again being energized by switch 55, but interrupted during heating of the water. Near the end of the second full rinse, the switch 27 closes, followed by energization of the drain pump 35. After the water for this second full rinse is emptied from the tub, and while the drain pump 35 remains in operation, the spin clutch 22 is again actuated for several minutes to effect centrifuging of wash water from the textiles. At the end of the centrifuging or spin period the timer motor will have advanced the timer to the "off" position in which all of the timer switches are open.

*Second embodiment*

There are some washing machine installations where the maximum electrical load of the machine is limited. When lower wattage electrical heaters are used to reduce the electrical load, the water heating period is lengthened and continuous agitation or tumbling of the clothes during a prolonged heating period might be detrimental to the lift of the fabrics being cleaned. Accordingly, the control circuit of Fig. 3 causes energization of the tumbling drive motor 16 to be interrupted when the heaters 51 are energized during the wash step of the washing program.

Figure 3:
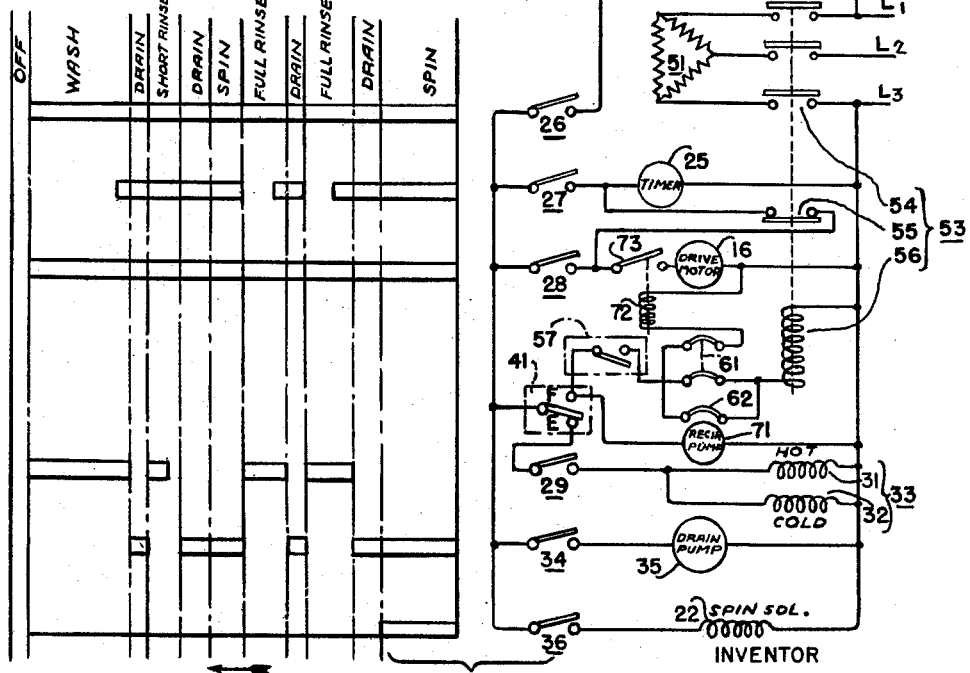
Fig. 3 is a control circuit diagram illustrating a modification of the invention.

The washing programs shown at the left in Figs. 2 and 3, and indicating the sequence of operation of timer switches 26, 27, 28, 29, 34 and 36, are identical. The circuit of Fig. 3 is generally similar to that of Fig. 2 except for the addition of a recirculating pump 71, having its own separate motor, and a relay 72 having a switch 73 in series with the drive motor 16 and closed when deenergized. The pump 71 replaces the recirculating pump 49 that is driven by the drive motor 16 in the first embodiment of the invention. The electrical connections for pump 71 are made to the upper contact of the water level control 41 and to conductor L3 of the power source, so that the pump operates only when the water level in the tub rises sufficiently to actuate the water level control 41.

In Fig. 3, both of the switches of thermostat 61 are connected in series with the upper pole of the water level control 41 and flow switch 57. One of these switches is connected to control the energization of relay coil 56, as in Fig. 2. The other switch, however, is now connected to control the operation of relay 72, rather than the hot water solenoid 31, as in Fig. 2.

The operation of the control circuit of Fig. 3 differs from that of Fig. 2 in only three respects. The first and most important difference is that the normally closed switch 73 is held open, by energization of relay 72, to prevent drive motor 16 from operating when the water level control 41, flow switch 57 and thermostat 61 are conditioned to call for energization of the heater relay coil 56 during the wash step of the washing program. When the thermostat 61 is satisfied by the water reaching a predetermined temperature, this thermostat snaps open and remains open for the remainder of the washing program.

The operation of the control circuit of Fig. 3 also differs from that of Fig. 2 in that the recirculating pump 71 is energized only when the water level control 41 is actuated by a full load of water in the tub, rather than continuously as in Fig. 2, and the hot water solenoid may be energized during the rinsing periods since it is not controlled by the thermostat 61 as it was in Fig. 2.

In both of the above described embodiments of the invention, the heater 51 is protected by the water level control switch 41, the flow switch 57 and the thermostats 61 and 62, to assure completely safe operation of the heaters and prevent damage that might otherwise occur by heating with insufficient water in the tank 45. These control circuits may also be applied to a washing machine (not shown) in which the heaters 51 are mounted within the bottom of the tub to directly heat the water therein. In such an arrangement the flow switch may be eliminated, along with the recirculating pump 49 or 71. With this arrangement the thermostats 61 and 62 could be mounted on the side of the tub rather than on the tank 45.

While the invention has been shown in several forms, it will be obvious to those skilled in the art that it is not so limited, but is susceptible of various other changes and modifications without departing from the spirit thereof.

What is claimed is:

In a washing machine for textiles or the like, the combination of a tub for containing said textiles, means for admitting washing liquid to said tub, a liquid heating tank, conduit means connecting said tank and said tube, a motor driven pump for recirculating liquid through said tub and tank, electrical means for heating liquid in said tank, a motor driven timer controlling said liquid admitting means during a washing program that includes a wash and a rinse period, a pair of thermostatic switches connected in parallel and responsive to the temperature of the heated liquid for controlling energization of said heater, a third switch closable in response to the presence of liquid in said tub, a fourth switch closable in response to flow of liquid through said heating tank, said third and fourth switches being connected in series with said parallel connected thermostatic switches for controlling said heater, one of said thermostatic switches being manually adjustable for predetermining the temperature to which said liquid is heated during the wash period, said manually adjustable switch being opened in response to the heating of the liquid to said predetermined temperature and remaining open for the remainder of the washing program, the other of said thermostatic switches controlling heating of said liquid during said rinse period.

References Cited in the file of this patent

UNITED STATES PATENTS

| | | |
|---|---|---|
| 2,173,564 | Osuch | Sept. 19, 1939 |
| 2,248,007 | Michaels | July 1, 1941 |
| 2,341,894 | Bariffi | Feb. 15, 1944 |
| 2,693,097 | Chatelain | Nov. 2, 1954 |
| 2,803,124 | Howlett et al. | Aug. 20, 1957 |

FOREIGN PATENTS

| | | |
|---|---|---|
| 163,257 | Australia | June 8, 1955 |
| 859,597 | Germany | Dec. 15, 1952 |

UNITED STATES PATENT OFFICE
CERTIFICATE OF CORRECTION

Patent No. 2,914,935            December 1, 1959

Kenneth E. Sampsel

It is hereby certified that error appears in the printed specification of the above numbered patent requiring correction and that the said Letters Patent should read as corrected below.

Column 2, line 71, for "tube" read -- tub --; column 6, line 18, for "lift" read -- life --; line 74, for "pump" read -- pumps --; column 7, line 12, for "tube" read -- tub --.

Signed and sealed this 21st day of June 1960.

(SEAL)
Attest:
KARL H. AXLINE
Attesting Officer

ROBERT C. WATSON
Commissioner of Patents